US008553707B2

(12) United States Patent
Swinkels et al.

(10) Patent No.: US 8,553,707 B2
(45) Date of Patent: Oct. 8, 2013

(54) ADMINISTRATIVE BOUNDARIES IN SINGLE OR MULTIPLE DOMAIN OPTICAL NETWORKS

(75) Inventors: Gerard L Swinkels, Ottawa (CA); Darek Skalecki, Ottawa (CA); Manuel Damas, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 335 days.

(21) Appl. No.: 13/037,732

(22) Filed: Mar. 1, 2011

(65) Prior Publication Data
US 2012/0224845 A1    Sep. 6, 2012

(51) Int. Cl.
*H04L 12/28* (2006.01)
(52) U.S. Cl.
USPC ............. 370/401; 370/420; 370/463; 398/55; 398/56; 398/57
(58) Field of Classification Search
None
See application file for complete search history.

(56) References Cited

U.S. PATENT DOCUMENTS

| | | | |
|---|---|---|---|
| 6,859,431 B1 | 2/2005 | Tedijanto et al. | |
| 7,009,934 B1 | 3/2006 | Perkins et al. | |
| 7,027,731 B1 | 4/2006 | Wang et al. | |
| 7,173,930 B2 | 2/2007 | Wellbaum et al. | |
| 7,711,828 B2 | 5/2010 | Shew et al. | |
| 7,733,870 B1 | 6/2010 | Liu et al. | |
| 7,782,879 B2 | 8/2010 | Roch et al. | |
| 2006/0133266 A1 | 6/2006 | Kim et al. | |
| 2006/0245413 A1 | 11/2006 | Skalecki et al. | |
| 2006/0250948 A1* | 11/2006 | Zamfir et al. | 370/216 |
| 2009/0257746 A1 | 10/2009 | Reina et al. | |
| 2010/0008262 A1* | 1/2010 | Fujii et al. | 370/254 |
| 2010/0226647 A1 | 9/2010 | Sun | |
| 2013/0004170 A1* | 1/2013 | Reina et al. | 398/57 |

* cited by examiner

*Primary Examiner* — Donald Mills
(74) *Attorney, Agent, or Firm* — Clements Bernard PLLC; Christopher L. Bernard; Lawrence A. Baratta, Jr.

(57) ABSTRACT

The present disclosure provides systems and methods for administrative boundaries in a single domain optical network such as emulation of an External network-network interface (ENNI) using an Internal-Network to Network Interface (INNI). For example, in a single monolithic domain, a network and associated network elements may discover network elements, build topology, compute paths, establish new calls, etc. A user may identify/mark specific links as emulated "ENNI" links with the specific links actually being INNI links. As a call traverses this emulated link, a new call is initiated (much in the same way a new call segment would be created for a call). Signaling proceeds as normal. When the call set-up is fully complete, instead of a single call segment, many call segments exists. Advantageously, this allows use of INNI control plane features while allowing a network operator to future-proof their network by installing call segments at future boundary points.

18 Claims, 8 Drawing Sheets

ADMINISTRATIVE BOUNDARIES IN SINGLE OR MULTIPLE DOMAIN OPTICAL NETWORKS

FIELD OF THE INVENTION

The present invention relates generally to communication networks. More particularly, the present invention relates to systems and methods for administrative boundaries in a single or multiple domain optical network such as, for example, emulating an External network-network interface (ENNI) using Internal-Network to Network Interface (INNI).

BACKGROUND OF THE INVENTION

Control plane implementations provide automated setup and control of services in a network. Advantageously, control planes offer multi-vendor and inter-domain inter-working, enhanced service offerings such as Ethernet over SONET/SDH or Optical Transport Network (OTN), end-to-end service activation, cross-domain provisioning of switched connection services, service restoration and the like. Traditionally, creating traffic paths through a series of Network Elements (NEs) has involved configuration of individual cross-connects on each NE. Control planes allow a user to specify the start point, end point, and bandwidth required, and an agent on the Network Elements allocates a path through the network, provisioning the traffic path, setting up cross-connects, and allocating bandwidth from the paths for the user requested service. The actual path that the traffic will take through the network is not specified by the user. Several control plane standards exist including International Telecommunication Union ITU-T Automatically Switched Optical/Transport Network (ASON/ASTN), Internet Engineering Task Force (IETF) Generalized Multi-Protocol Label Switching (G-MPLS), Optical Internetworking Forum (OIF) Implementation Agreements, Tele-Management Forum (TMF) models for the management plane, and the like.

ASON specifications generally define an optical control plane communication framework. G-MPLS defines control plane discovery, routing, and signaling protocols. OIF Implementation Agreements define protocol extensions for multi-vendor interoperability. One such OIF Implementation Agreement is the External Network-Network Interface (ENNI) OSPF-based (Open Shortest Path First) Routing 1.0 Intra-Carrier Implementation Agreement, OIF-ENNI-OSPF-01.0, January 2007. To scale control planes or to connect multiple domains, typically an ENNI is utilized to interconnect Internal-Network to Network Interface (INNI) domains together. Disadvantageously, ENNI standards are immature relative to the features found on the INNI. Further, the INNI may include advanced proprietary features not available in standardized or competitor's control planes. It is also inefficient to port existing features to the ENNI.

BRIEF SUMMARY OF THE INVENTION

In an exemplary embodiment, a network includes a plurality of network elements, a plurality of links interconnecting the plurality of network elements, a control plane communicatively coupled to the plurality of network elements and the plurality of links, and designations on one or more of the plurality of links defining an administrative boundary relative to call segmentation. Optionally, the plurality of network elements is in a single, monolithic domain and the designations form emulated domains within the single, monolithic domain. Each of the plurality of links may include an Internal-Network to Network Interface. Each of the plurality of links with the designations may include an Internal-Network to Network Interface emulating an External network-network interface. The control plane may include one of Automatically Switched Optical Network (ASON), Generalized Multi-Protocol Label Switching (GMPLS), and Optical Signaling and Routing Protocol. The network may further include controllers on each of the plurality of network elements, wherein the controllers are communicatively coupled to one another, and wherein the controllers are configured to perform call control to establish services between the plurality of network elements. The controllers are configured to segment a call when traversing one of the plurality of links with the designations. The controllers may be configured to perform restoration on the plurality of links with the designations, and the restoration may include segment restoration, and if segment restoration is unavailable or fails, the restoration may include end-to-end restoration.

In another exemplary embodiment, a method includes forming an optical network between a plurality of network elements utilizing a control plane therebetween, designating one or more links between the plurality of network elements as boundary links with respect to the control plane, performing a call using the control plane, and at each of the designated one or more links, performing call segmentation for the call. Optionally, the plurality of network elements are in a single, monolithic domain and the boundary links form emulated domains within the single, monolithic domain. The plurality of network may be interconnected by Internal-Network to Network Interfaces. The designated one or more links may be an Internal-Network to Network Interface emulating an External network-network interface. The method may further include providing Internal-Network to Network Interface features across all links in the optical network, and treating the designated one or more links as External network-network interfaces for call segmentation. The control plane may include one of Automatically Switched Optical Network (ASON), Generalized Multi-Protocol Label Switching (GMPLS), and Optical Signaling and Routing Protocol. The method may further include based on a failure on one of the one or more links, performing segment restoration, and if the segment restoration is not possible, performing end-to-end restoration.

In yet another exemplary embodiment, a control processor includes circuitry disposed in a network element, a communications interface to a plurality of interconnected network elements to the network element, wherein the circuitry is configured to designate one or more links between the network element and the plurality of interconnected network elements as boundary links with respect to a control plane, perform a call using the control plane, and at each of the designated one or more links, perform call segmentation for the call. The control plane may include one of Automatically Switched Optical Network (ASON), Generalized Multi-Protocol Label Switching (GMPLS), and Optical Signaling and Routing Protocol.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for administrative boundaries in a single domain optical network. In an exemplary embodiment, the present invention provides emulation of an External network-network interface (ENNI) using an Internal-Network to Network Interface (INNI). For example, in a single monolithic domain, a network and associated network elements may discover network elements, build topology, compute paths, establish new calls, etc. A user may identify/mark specific links as emulated "ENNI" links with the specific links actually being INNI links. Subsequently when a new call is initiated, a call segment is ended at the emulated ENNI link from that call segment's point-of-view. Signaling is accomplished across the emulated ENNI link. As the call has traversed this emulated link, a new call is initiated (much in the same way a new call segment would be created for a call). Signaling proceeds as normal. When the call set-up is fully complete, instead of a single call segment, many call segments exists. Advantageously, this call segmentation and administrative boundary via emulated ENNI links allows use of INNI control plane features while allowing a network operator to future-proof their network by installing call segments at future boundary points. When the network operator wants to segment their domains with real ENNI links, all the call segments are in place. Furthermore, the administrative boundaries may be used to segment different restoration schemes in the same domain based on the designated segmentation. Those of ordinary skill in the art will recognize the administrative boundaries may be utilized for a plurality of applications in a network.

Figure 1:
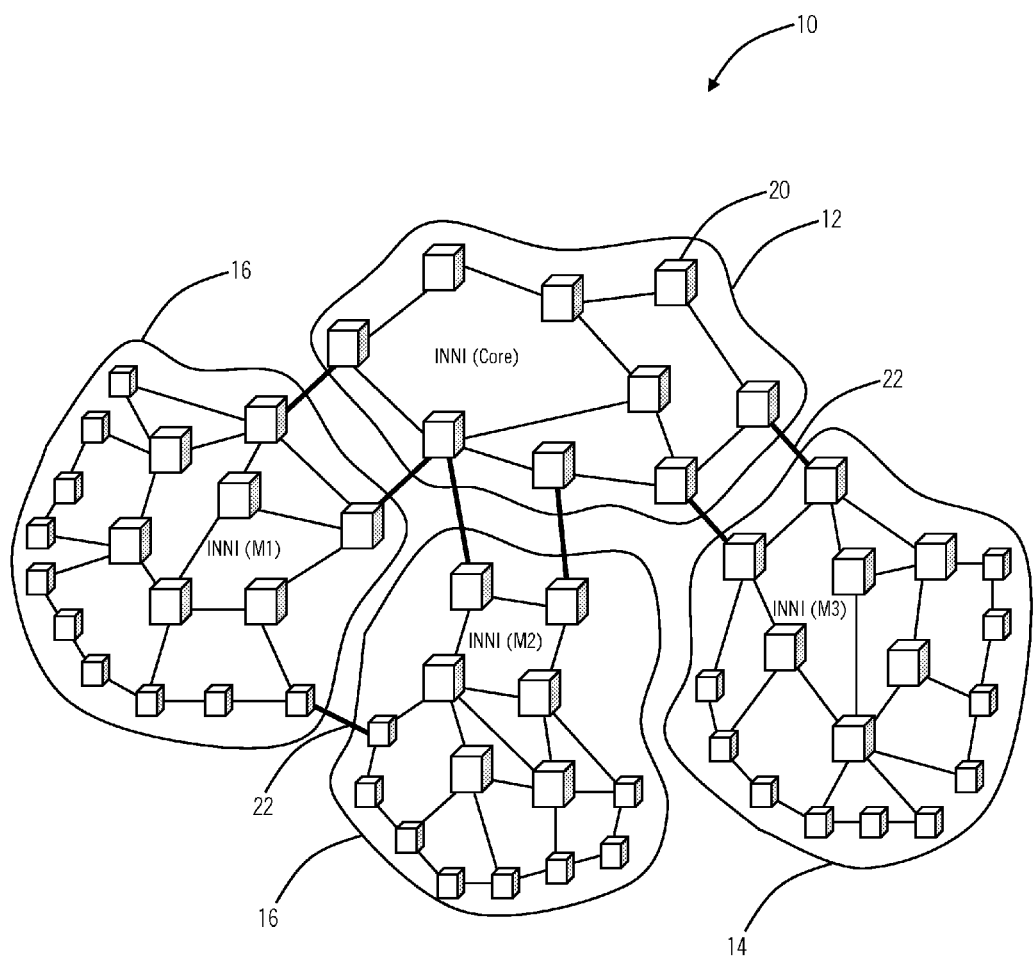
FIG. 1 is a network diagram of a network with multiple domains of a plurality of interconnected network elements.

Referring to FIG. 1, in an exemplary embodiment, a network 10 is illustrated with multiple domains 12, 14, 16, 18 of a plurality of interconnected network elements 20. For example, the network 10 may include a core INNI mesh domain 12 interconnected to numerous metro INNI mesh domains 14, 16, 18 via redundant ENNI links 22 between the domain 12 and the domains 14, 16, 18. Assume, for example, the core INNI mesh domain includes approximately 50 to 100 network elements 20 and each of the metro INNI mesh domains 14, 16, 18 includes on the order of 100 network elements 20. In this case, the network 10 includes a fragmented network with undersized domains and many of the ENNI links 22. Further, as described herein, the domains 12, 14, 16, 18 lose features over the ENNI links 22 that are incorporated within the domains 12, 14, 16, 18. Note, FIG. 1 illustrates the domain 12 as an INNI (Core) with the domains 14, 16, 18 as INNI Metros (M1, M2, M3), but those of ordinary skill in the art will recognize that other embodiments could be between INNI Metro domains. Further, the domains 12, 14, 16, 18 may include a plurality of the network elements 20 designated as Border Nodes (BNs).

Figure 2:
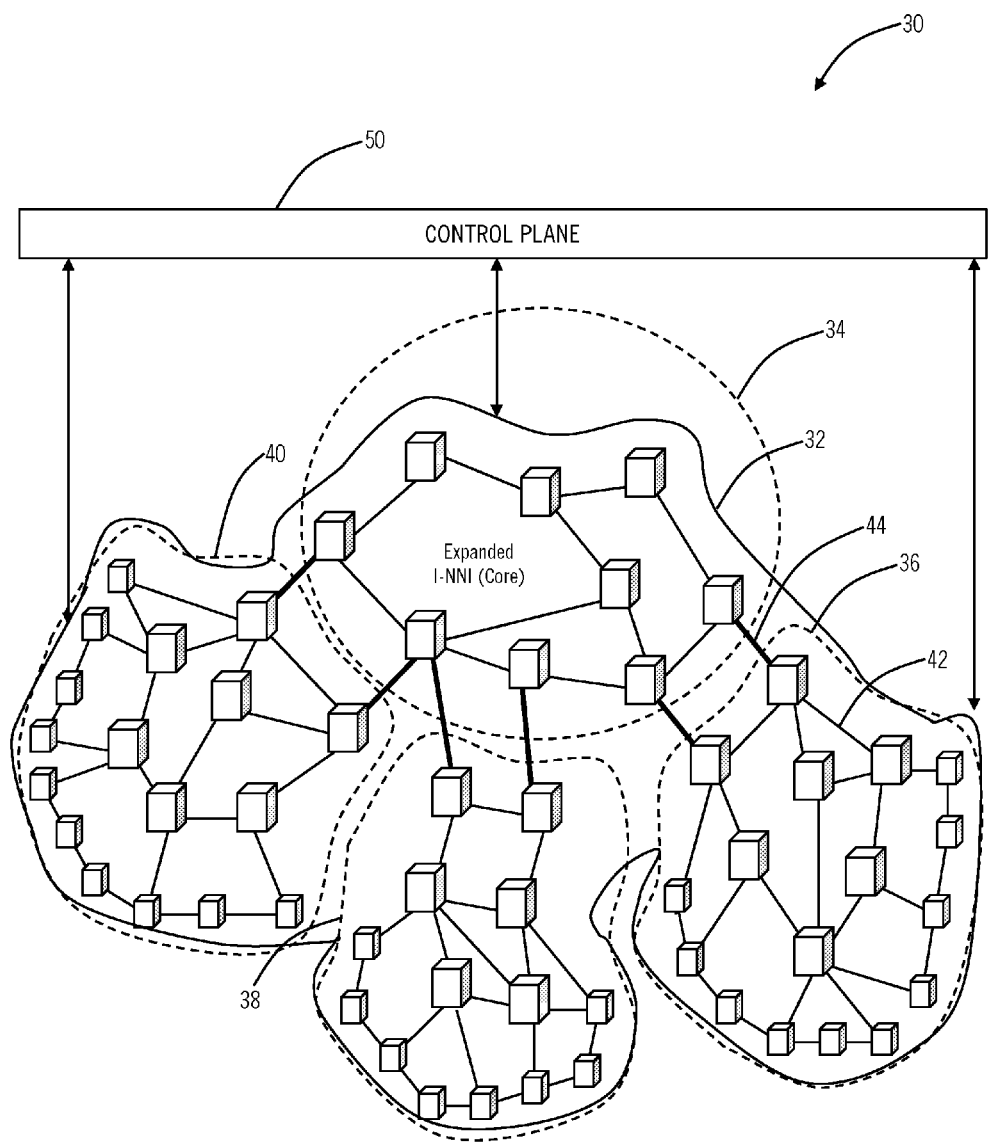
FIG. 2 is a network diagram of a network with a single monolithic domain that includes emulated domains.

Referring to FIG. 2, in an exemplary embodiment, a network 30 is illustrated with a single monolithic domain 32 that includes emulated domains 34, 36, 38, 40. Specifically, the network 30 includes the same plurality of interconnected network elements 20, but in the single monolithic domain 32. That is, each link 42 in the network 30 is initially an INNI link. The present invention includes boundary links 44 that are denoted as emulated ENNI links by a user or network operator. Thus, the boundary links 44 form the emulated domains 34, 36, 38, 40. The network 30 is formed with all of the network elements 20 in the single monolithic domain 32. Specifically, the network 30 initially enables monolithic domain discovery, topology messaging and building, computation of paths, and establishment of new calls. A network operator may identify any of the links 42 as one of the boundary links 44 or an emulated ENNI link. This identification may be accomplished via a network management system (NMS), element management system (EMS), craft interface (CI), and the like. Such designations may be communicated to the network elements 20 via standard control plane mechanisms, etc. Of note, the present invention is described herein with reference to the single monolithic domain 32. However, the boundary links 44 may be used in actual multiple domain implementations, e.g. the network 10 of FIG. 1. That is, the boundary links 44 may be used with the actual ENNI links 22 in a real network deployment.

The network elements 20 may be an optical switch, a cross-connect, an Ethernet switch, a router, a multi-service provisioning platform (MSPP), a dense wave division multiplexed (DWDM) platform, an Optical Transport Network (OTN) switch, a Synchronous Optical Network (SONET) multiplexer, a Synchronous Digital Hierarchy (SDH) multiplexer, or combinations thereof. In an exemplary embodiment, the network elements 20 may include an optical switch which consolidates various function into a single, high-capacity intelligent switching system providing layer 0, 1, and 2 consolidation. In an exemplary embodiment, the links 42 and the boundary links 44 between the network elements 20 operate according SONET, SDH, OTN, or combinations thereof.

The network 30 may utilize various control plane protocols as are known in the art. A control plane 50 includes software, processes, algorithms, etc. that control configurable features of the network 30, such as automating discovery of network elements 20, capacity on the links 42, 44, port availability on the network elements 20, connectivity between ports; dissemination of topology and bandwidth information between the network elements 20; calculation and creation of paths for connections; network level protection and restoration; and the like. In an exemplary embodiment, the control plane 50 may utilize Automatically Switched Optical Network (ASON) as defined in G.8080/Y.1304, Architecture for the automatically switched optical network (ASON) (02/2005) and the like. In another exemplary embodiment, the control plane 50 may utilize Generalized Multi-Protocol Label Switching (GM-PLS) Architecture as defined in Request for Comments: 3945 (10/2004) and the like. In yet another exemplary embodiment, the control plane 50 may utilize Optical Signaling and Routing Protocol (OSRP) from Ciena Corporation of Linthicum, Md. which is an optical routing protocol similar to PNNI (Private Network-to-Network Interface) and MPLS (Multi-protocol Label Switching). Those of ordinary skill in the art will recognize the network 30 and the control plane 50 may utilize any type control plane for controlling the network elements 20 and establishing connections therebetween. The control plane 50 may be centralized, distributed, or a combination thereof.

Figure 3:
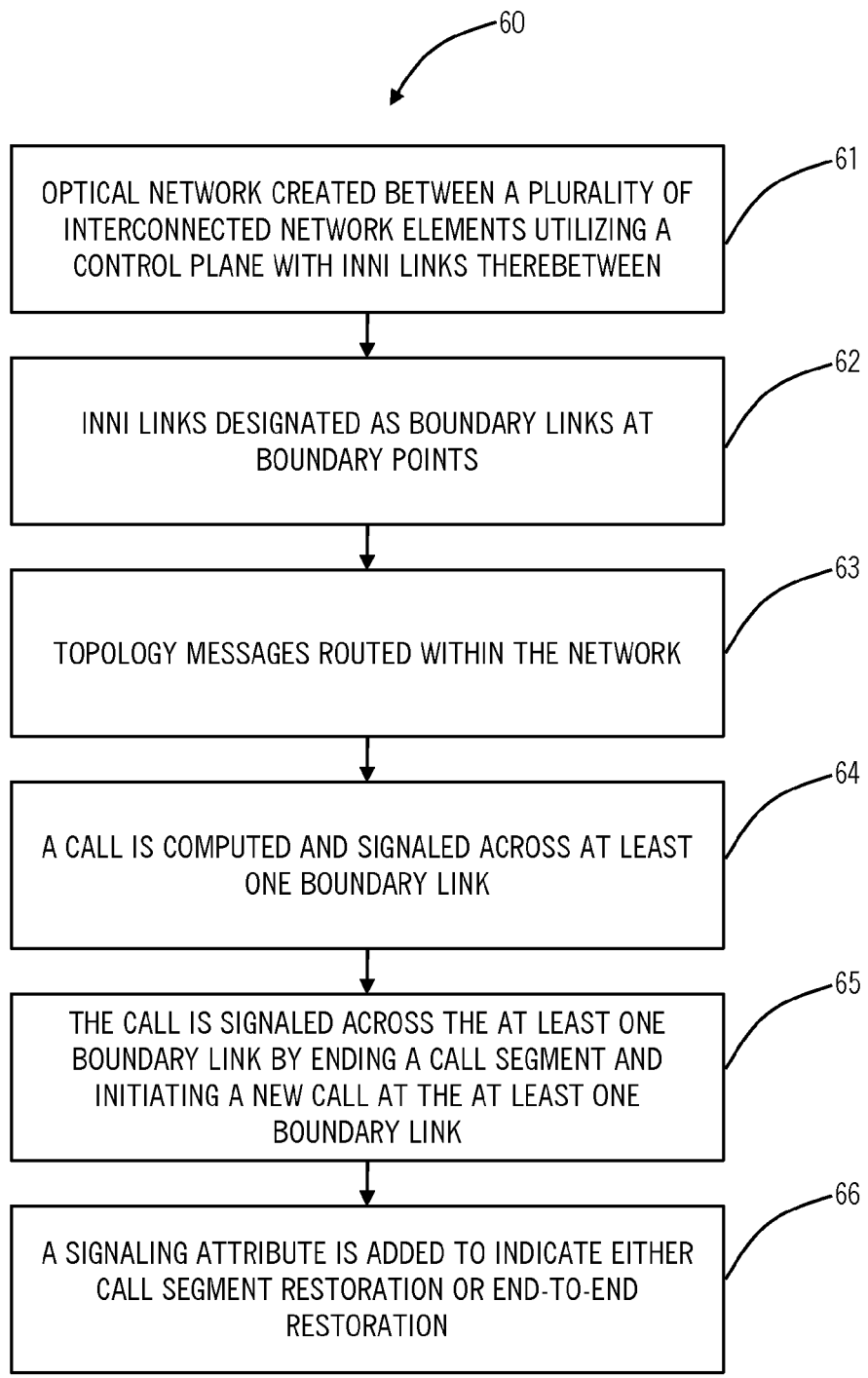
FIG. 3 is a flowchart of an exemplary method for use in an optical network, such as the network of FIG. 2, for creating a monolithic domain, emulating domains therein, and operation thereof.

Referring to FIG. 3, in an exemplary embodiment, a flowchart illustrates an exemplary method 60 for use in an optical network, such as the network 30, for creating a monolithic domain, emulating domains therein, and operation thereof. The method 60 may include creating an optical network, such as the network 30, between a plurality of interconnected network elements utilizing a control plane with INNI links therebetween (step 61). At this point, the optical network is a single, monolithic domain with every link interconnecting the network elements an INNI link, i.e. from the perspective of the control plane. A network operator may designate particular INNI links as boundary links at boundary points (step 62). Here, the network operator may designate the boundary links where ENNI links were to be used, i.e. the boundary links are used in lieu of ENNI links. The boundary links are INNI links that are designated as boundary links, e.g. emulated ENNI links. It is envisioned that the network operator will designate links that were to be ENNI as boundary links. Advantageously, the method 60 enables INNI functionality across the boundary links and any advanced features that are available on INNI links but not on ENNI links while still acting as an ENNI link for boundary or call segmentation purposes. Topology messages are routed or flooded within the network (step 63). Note, the topology messages may be routed or flooded prior to step 62 and continually as the network operates. In an exemplary embodiment, the topology messages may include HELLO packets and may include link information such as whether or not a link is designated as a boundary link. The designators need not be flooded in topology messages, i.e. it may be determined at signaling time that call segmentation is to be done when traversing an emulated link. When it is not flooded then path computation simply computes a route and when signaling establishes that route then segmentation is done on emulated links. Thus designators may or may not be flooded.

At some point in the method 60, a call may be computed and signaled across at least one boundary link. In a control plane implementation, a call is a construct that reflects a service association that is distinct from physical hardware/infrastructure. It should be noted that the term "call" has a technical definition, which is broader than the conventional "telephone call" between two people. Specifically, a call is the representation of the service offered to the user of a network layer, while the connection is one of the means by which networks deliver the service. There may be other entities used in supporting calls, such as service specific processes. Without limiting the generality of the foregoing, a call may be described as an association between two or more users and one or more domains that supports an instance of a service through one or more domains. Within domains, the association is supported by network entities that contain call state. Between a user and a network call control entity and between network call control entities, there are call segments. The call consists of a set of concatenated call segments. That is, the call supports the provisioning of end-to-end services in the network while preserving the independent nature of the various businesses involved. For example in ASON, G.807/Y.1302 Requirements for automatic switched transport networks (ASTN) Call and Connection Management and G.7713/Y.1704 Distributed call and connection management (DCM) relate to call control. G.8080 defines two types of call controllers: calling/called party call controllers (CCCs); and network call controllers (NCCs). Calling/called party call controllers initiate and terminate calls, whereas network call controllers interact with the CCCs and with connection controllers to manage connections within the network. For example in GMPLS, RFC 4139 Requirements for Generalized MPLS (GMPLS) Signaling Usage and Extensions for Automatically Switched Optical Network (ASON) describe GMPLS calls.

Figure 4A:
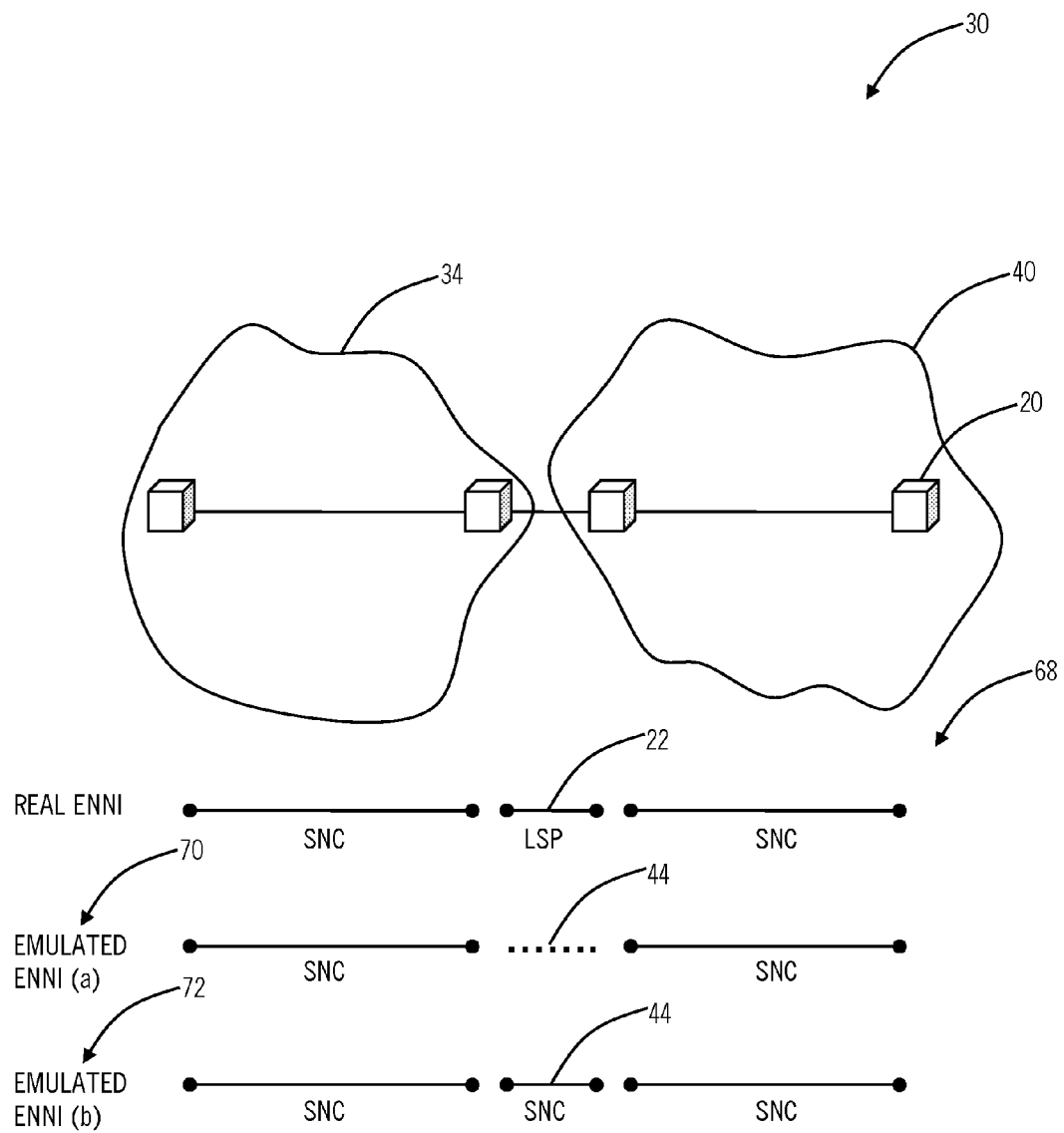
FIG. 4A is a network diagram of a portion of the network of FIG. 2 showing exemplary call segments for actual ENNI implementations and emulated boundary links.

The call is signaled across the at least one boundary link by ending a call segment and initiating a new call at the at least one boundary link (step 65). Specifically, when a call has been computed, it is signaled in s normal manner. When it encounters an "ENNI" link, i.e. a boundary link, at this point the call segment is "ended" (from a call segment point-of-view). In one exemplary embodiment, the method 60 signals across the marked boundary link in a similar fashion as in ENNI. However, instead of using a Label Switched Path (LSP), the method 60 may use a Subnetwork Connection (SNC). In another exemplary embodiment, the method 60 may simply have no SNC in place between the boundary, but call segmentation. Note, FIG. 4A illustrates these two exemplary embodiments, as the call has traversed this marked boundary link, a new call is initiated (much in the same way a new call segment would be created for a call) and signaling proceeds as normal. When the call set-up is fully complete, instead of a single call segment across the network, many call segments exists. The method 60 allows the network to exploit all control plane features with all links being INNI while allowing network operators to future-proof their network by installing call segments at future boundary points at the boundary links. When the network operator wants to segment their domains, all the call segments are in place. The key element is an indication that call segmentation is needed. It could be a local link attribute or something that is flooded in the network. Also, it is desirable to link the call segments together (to aid the management plane is stitching the call segments together to indicate the end-to-end service.) A signaling attribute could be added to indicate either call segment restoration or end-to-end restoration (step 66). There may be an additional signaling attribute to remove the call. Also, it is envisioned that the full topology is flooded across the "ENNI" boundary links, but this does not have to or could be a provisionable feature.

Referring to FIG. 4A, in an exemplary embodiment, a portion of the network 30 is illustrated showing exemplary call segments 68 for actual ENNI implementations and emulated boundary links 44. In a network such as the network 30, an end-to-end server may be defined as a request, call segments, and the actual connections forming the physical service. In an actual ENNI implementation, the call segments 68 in the domains 34, 40 are SNCs while the call segment 68 over the ENNI link 22 is an LSP. The present invention contemplates two options 70, 72 with respect to the boundary links 44. In a first exemplary embodiment, an option 70 (referred to as emulated ENNI (a)) has no actual connection in the link 44 for that call segment 68. For example, the SNCs on either side of the link 44 extend to the same network element 20 that terminates the previous call segment. Thus, there is an INNI call segment in the domain 34 and an INNI call segment in the domain 40 with no call segment on the link 44. Here, to convert to a real ENNI, all that needs to occur is the creation of an LSP on the link 44 and insertion of the call segment. In a second exemplary embodiment, an option 72 (referred to as emulated ENNI (b)) has an actual SNC connection in the link 44 for that call segment 68. For example, there are three call segments 68 here—one in the domain 34, one on the link 44, and one in the domain 40—all of which include SNCs. To convert the option 72 into a real ENNI, the SNC may be converted to an LSP—such as adding a LSP and deleting the SNC, etc.

Figure 4B:
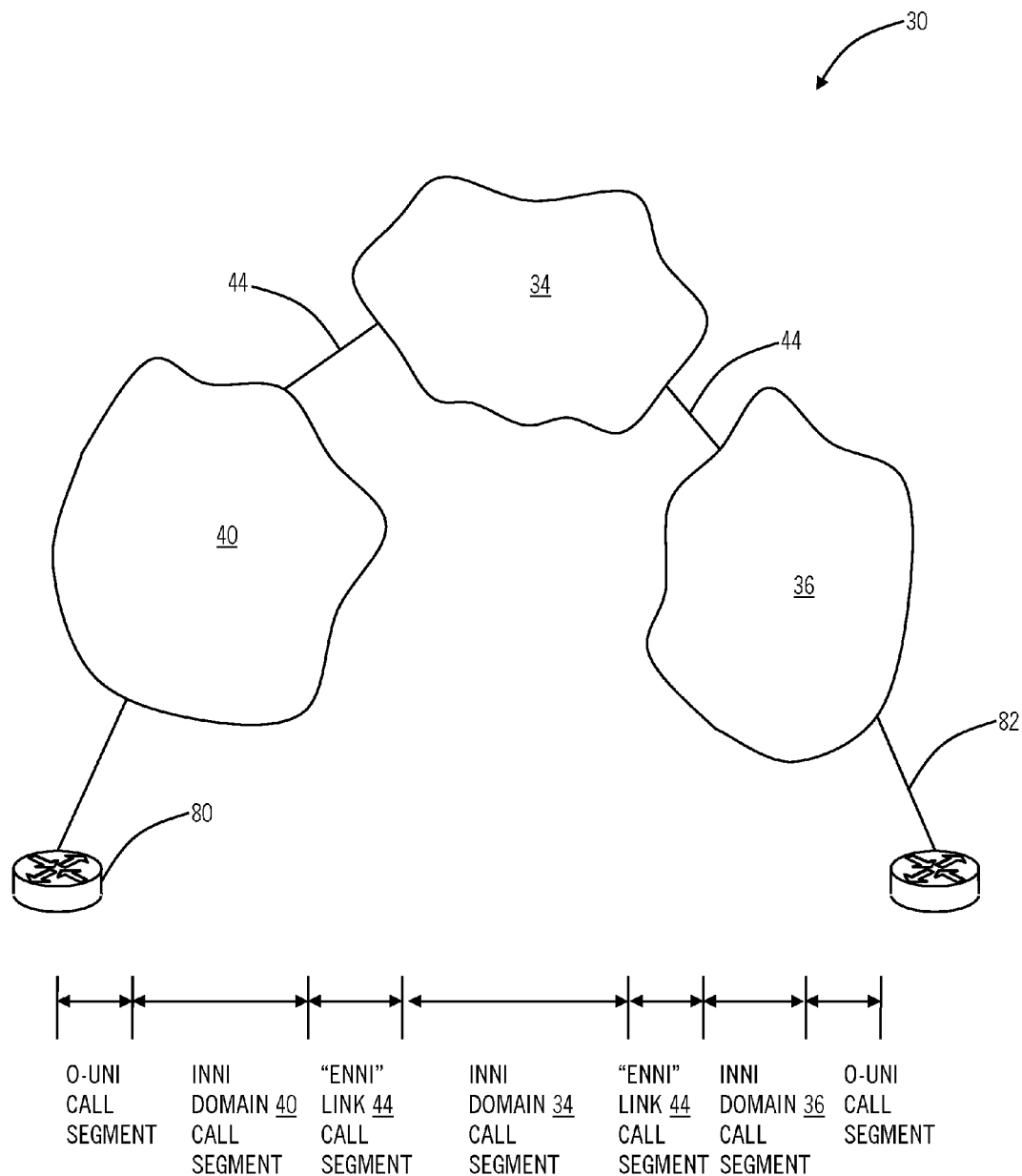
FIG. 4B is a network diagram of a portion of the network of FIG. 2 showing exemplary signaling between two devices across the boundary links forming the emulated domains using one of the options in FIG. 4A.

Referring to FIG. 4B, in an exemplary embodiment, a portion of the network 30 is illustrated showing exemplary signaling between two devices 80, 82 across the boundary links 44 using the option 72. Signaling is the control messaging between switching entities in the network 30 and is used to create, modify, tear down, and restore connections and to provide automated connection management for protection and restoration. Connection provisioning requires the identification of two connection end points, e.g. the devices 80, 82, and the connection attributes, e.g. bandwidth, etc. For example, the signaling may utilize G.7713.2 UNI/ENNI messages such as PATH, RESV, etc. The signaling may also utilize Resource Reservation Protocol-Traffic Engineering (RSVP-TE). As described herein, the network 30 actually only includes one monolithic domain, but includes so-called emulated domains 34, 36, 40 as determined by the boundary links 44. In an exemplary call setup between the devices 80, 82, there are O-UNI call segments between the device 80 and the domain 40 and between the device 82 and the domain 36. OIF defines an Optical User to Network Interface (O-UNI) for an interface between a client network and an optical network. This further includes signaling and connection creation, deletion, query, and the like, and does not provide topology information exchanged between client and network. OIF also defines an External Network Node Interface (ENNI) between optical networks and between areas within a single network. As described, the present invention does not use ENNI, but rather emulates ENNI on an INNI link providing segmentation similar to ENNI but enabling INNI features as well. In the network 30, a call between the devices 80, 82 will include an INNI domain 40 call segment, an ENNI link 44 call segment, an INNI domain 34 call segment, an ENNI link 44 call segment, and an INNI domain 36 call segment. Note, while these are all separate call segments from a segmentation perspective, the domains 34, 36, 40 may all still utilize INNI features.

Figure 5:
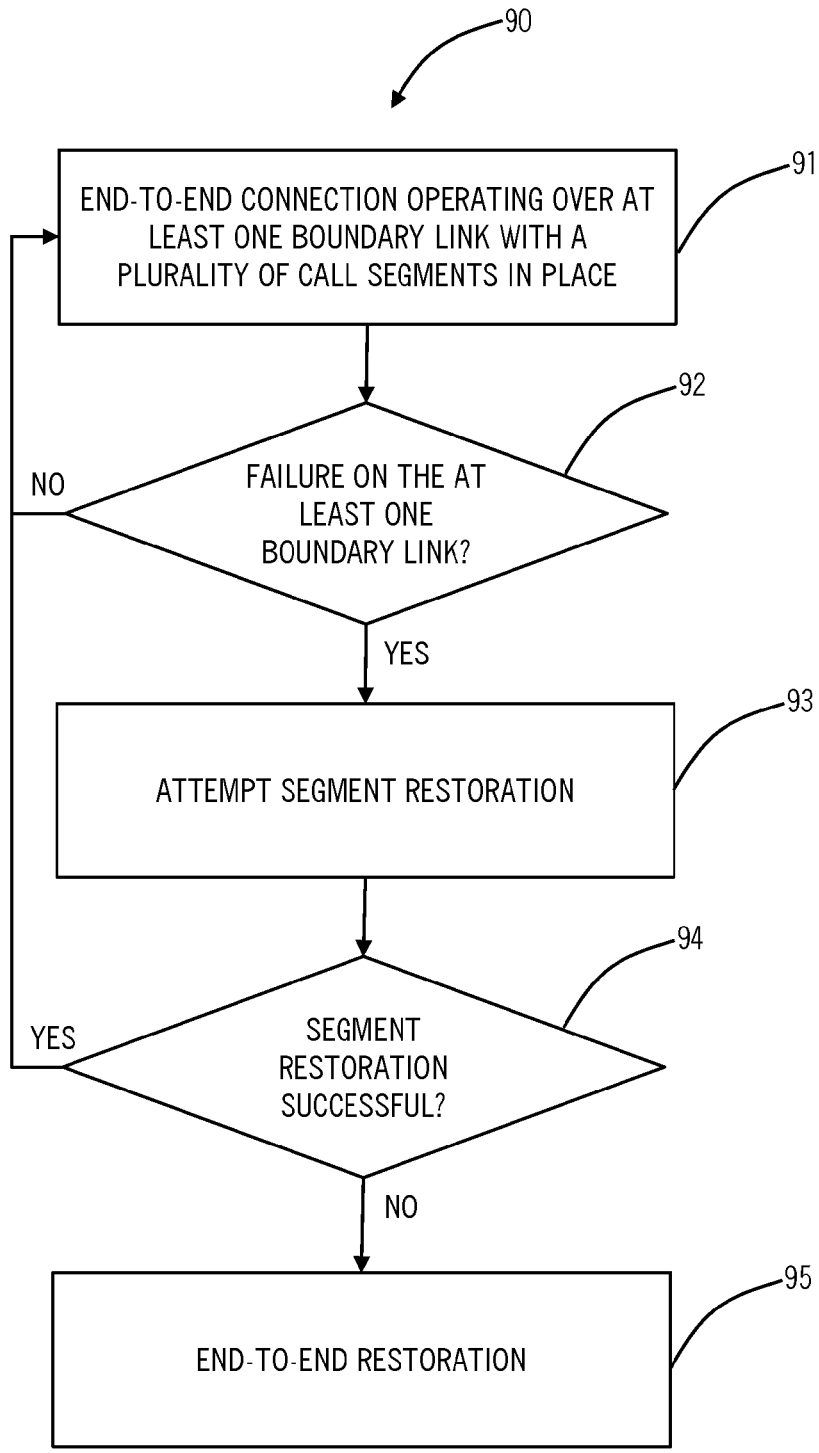
FIG. 5 is a flowchart illustrates an exemplary restoration method for the emulated boundary links such as in the network of FIG. 2.

Referring to FIG. 5, in an exemplary embodiment, a flowchart illustrates an exemplary restoration method 90 for the emulated boundary links 44 such as in the network 30. The method 90 may be utilized with either of the options 70, 72 with respect to the boundary links 44. At the outset, the method 90 begins with an end-to-end connection operating over at least one boundary link with a plurality of call segments in place (step 91). The method 90 detects a failure on the at least one boundary link (step 92). Specifically, the failure could be any condition that disrupts the call segment and/or the boundary links. The method 90 first attempts to perform segment restoration (step 93). In segment restoration, the end points are fixed and the operations depend on whether or not there is a call segment in place on the failed boundary links, i.e. the option 70 or the option 72. If there is no call segment in place, i.e. the option 70, then the method 90 cannot perform segment restoration (step 94) and must perform end-to-end restoration (step 95). If there is a call segment in place, i.e. the option 72, then the method 90 can perform segment restoration, such as, for example, using Local Span Mesh Restoration (LSMR) (see, U.S. Pat. No. 7,391,720, "Local Span Mesh Restoration (LSMR)," the contents of which are incorporated by reference herein.). Also, if segment restoration is not possible the option 72, then end to end restoration is carried out (step 95).

Figure 6:
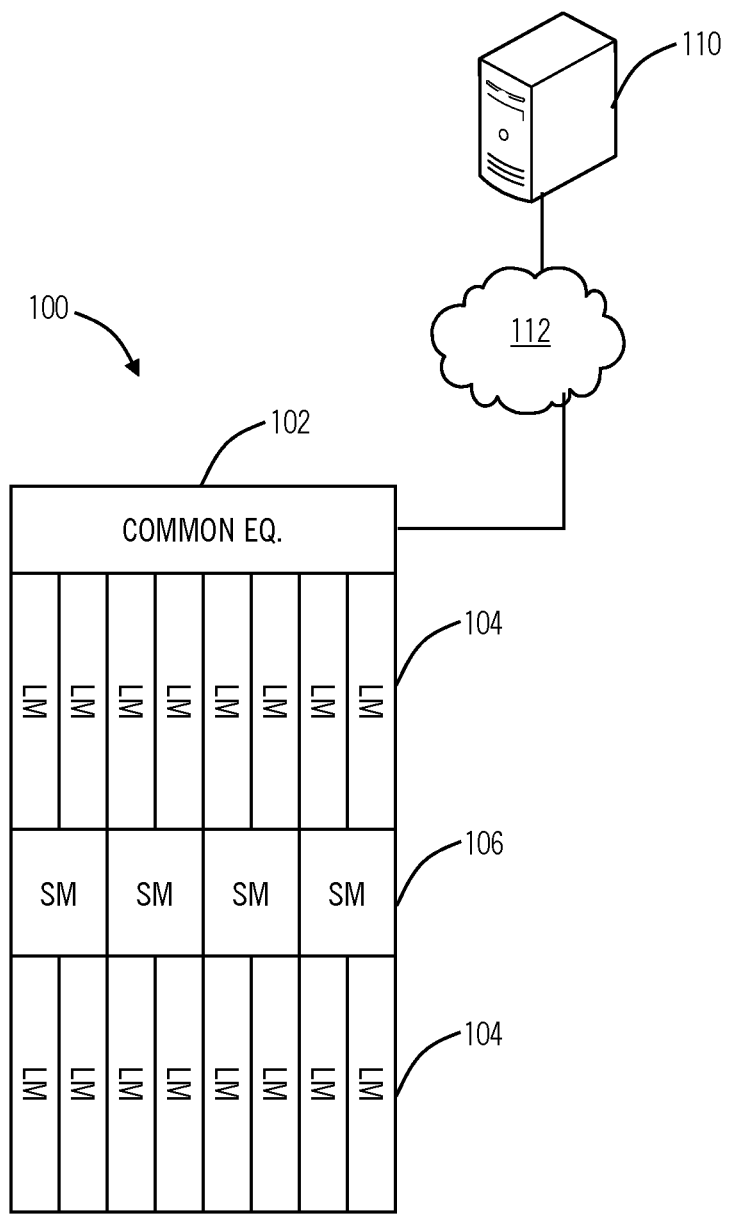
FIG. 6 is a block diagram of an exemplary optical switch which may be used in the network of FIG. 2 and with the method of FIG. 3.

Referring to FIG. 6, in an exemplary embodiment, an exemplary optical switch 100 is illustrated for use in the network 30 and with the method 60. The optical switch 100 is a network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing layer 0, 1, and 2 consolidation. Generally, the optical switch 100 includes common equipment 102, line modules (LM) 104, and switch modules (SM) 106. The common equipment 102 may include power, a control module, operations, administration, maintenance, and provisioning (OAM&P) access, and the like. For example, the common equipment 102 may connect to a management system 110 through a data communication network 112. The management system 110 may include a network management system (NMS), element management system (EMS), or the like. In an exemplary embodiment, the management system 110 may be utilized to designate the boundary links 44. Additionally, the common equipment 102 may include a control plane processor configured to operate the control plane and the systems and methods described herein.

The line modules 104 may be communicatively coupled to the switch modules 106, such as through a backplane, midplane, or the like. The line modules 104 are configured to provide ingress and egress to the switch modules 106, and are configured to provide interfaces for the OTN services described herein. In an exemplary embodiment, the line modules 104 may form ingress and egress switches with the switch modules as center stage switches for a three-stage switch, e.g. three stage Clos switch. The line modules 104 may include optical transceivers, such as, for example, 2.5 Gb/s (OC-48/STM-1, OTU1, ODU1), 10 Gb/s (OC-192/STM-64, OTU2, ODU2), 40 Gb/s (OC-768/STM-256, OTU3, ODU4), etc. Further, the line modules 104 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 104 may include DWDM interfaces, short reach interfaces, and the like, and may connect to other line modules 104 on remote optical switches 100, NEs, end clients, and the like. From a logical perspective, the line modules 104 provide ingress and egress ports to the optical switch 100, and each line module 104 may include one or more physical ports.

The switch modules 106 are configured to switch services between the line modules 104. For example, the switch modules 106 may provide wavelength granularity (layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; and the like. Specifically, the switch modules 106 may include both Time Division Multiplexed (TDM) and packet switching engines. The switch modules 106 may include redundancy as well, such as 1:1, 1:N, etc. Those of ordinary skill in the art will recognize the optical switch 100 may include other components which are omitted for simplicity, and that the systems and methods described herein are contemplated for use with a plurality of different network elements with the optical switch 100 presented as an exemplary type of network element.

Figure 7:
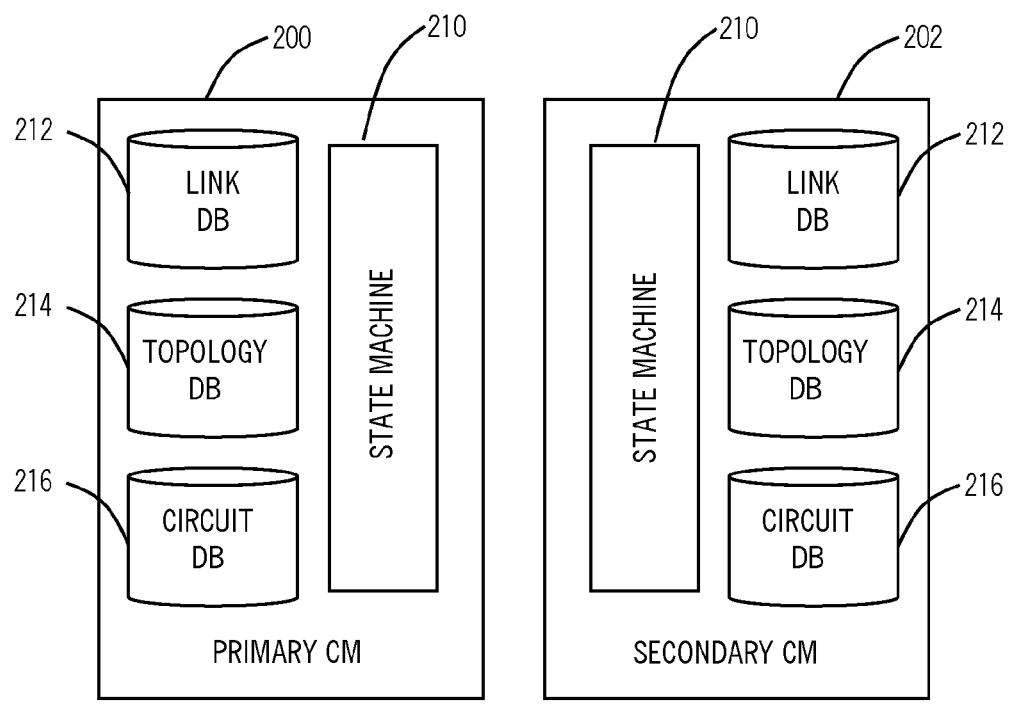
FIG. 7 is a block diagram of redundant control modules (CMs) for the optical switch of FIG. 5 to provide control plane processing.

Referring to FIG. 7, in an exemplary embodiment, redundant control modules (CMs) 200, 202 for the optical switch 100 are illustrated to provide control plane processing. For example, the control plane can include OSRP, ASON, GMPLS, and the like as described herein. The CMs 200, 202 may be part of common equipment, such as common equipment 102 in the optical switch of FIG. 6. The CMs 200, 202 may include a processor which is hardware device for executing software instructions such as operating the control plane 50. The processor may be any custom made or commercially available processor, a central processing unit (CPU), an auxiliary processor among several processors associated with the CMs 200, 202, a semiconductor-based microprocessor (in the form of a microchip or chip set), or generally any device for executing software instructions. When the CM 200, 202 is in operation, the processor is configured to execute software stored within memory, to communicate data to and from the memory, and to generally control operations of the CM 200, 202 pursuant to the software instructions.

The CMs 200, 202 may also include network interfaces, a data store, memory, and the like. The network interfaces may be used to enable the CMs 200, 202 to communicate on a network, such as to communicate control plane information to other CMs. The network interfaces may include, for example, an Ethernet card (e.g., 10BaseT, Fast Ethernet, Gigabit Ethernet) or a wireless local area network (WLAN) card (e.g., 802.11a/b/g). The network interfaces may include address, control, and/or data connections to enable appropriate communications on the network. The data store may be used to store data, such as control plane information received from NEs, other CMs, etc. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but may be accessed by the processor.

Each of the CMs 200, 202 include a state machine 210, a link database (DB) 212, a topology DB 214, and a circuit DB 216. The CMs 200, 202 are responsible for all control plane processing. The CMs 200, 202 may be configured in a redundant 1+1, 1:1, etc. configuration. The state machine 210 is configured to implement the behaviors described herein with regard to OTN mesh networking The DBs 212, 214, 216 may be stored in the memory and/or data store. The link DB 212 includes updated information related to each link in a network including designation of the boundary links 44. The topology DB 214 includes updated information related to the network topology, and the circuit DB 216 includes a listing of terminating circuits and transiting circuits at an NE where the CMs 200, 202 are located. The CMs 200, 202 may utilize control plane mechanisms to maintain the DBs 212, 214, 216. For example, HELLO messages can be used to discover and verify neighboring ports, nodes, protection bundles, boundary links, and the like. Also, the DBs 212, 214, 216 may share topology state messages to exchange information to maintain identical data. Collectively, the state machine 210 and the DBs 212, 214, 216 may be utilized to advertise topology information, capacity availability, and provide connection management (provisioning and restoration). For example, each link in a network may have various attributes associated with it such as, for example, line protection, available capacity, total capacity, administrative weight, protection bundle identification, delay, designation of boundary link, and the like. The state machine 210 and the DBs 212, 214, 216 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the CMs 200, 202 are configured to communicate to other CMs 200, 202 in other nodes on the network. This communication may be either in-band or out-of-band. For SONET networks, the CMs 200, 202 may use standard or extended SONET line overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 "Interfaces for the optical transport network (OTN)" G.709 are in-band side channel used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A network, comprising:
a plurality of network elements;
a plurality of links interconnecting the plurality of network elements, wherein each of the plurality of links comprises an Internal-Network to Network Interface;
a control plane communicatively coupled to the plurality of network elements and the plurality of links; and
designations on one or more of the plurality of links defining an administrative boundary relative to call segmentation, wherein each of the plurality of links with the designations comprises an Internal-Network to Network Interface emulating an External network-network interface, and wherein the emulating comprises providing Internal-Network to Network Interface features over a link while treating the link as an External network-network interface for call segmentation.

2. The network of claim 1, wherein the plurality of network elements are in a single, monolithic domain.

3. The network of claim 2, wherein designations form emulated domains within the single, monolithic domain.

4. The network of claim 1, wherein the control plane comprises one of Automatically Switched Optical Network (ASON), Generalized Multi-Protocol Label Switching (GMPLS), and Optical Signaling and Routing Protocol.

5. The network of claim 1, further comprising:
controllers on each of the plurality of network elements, wherein the controllers are communicatively coupled to one another, and wherein the controllers are configured to perform call control to establish services between the plurality of network elements.

6. The network of claim 5, wherein the controllers are configured to segment a call when traversing one of the plurality of links with the designations.

7. The network of claim 5, wherein the controllers are configured to perform restoration on the plurality of links with the designations.

8. The network of claim 7, wherein the restoration comprises segment restoration, and if segment restoration is unavailable or fails, the restoration comprises end-to-end restoration.

9. A method, comprising: forming an optical network between a plurality of network elements utilizing a control plane therebetween;
designating one or more links between the plurality of network elements as boundary links with respect to the control plane, wherein the plurality of networks are interconnected by Internal-Network to Network Interfaces and wherein the designated one or more links comprise an Internal-Network to Network Interface emulating an External network-network interface;
performing a call using the control plane;
at each of the designated one or more links, performing call segmentation for the call;
providing Internal-Network to Network Interface features across all links in the optical network; and
treating the designated one or more links as External network-network interfaces for call segmentation.

10. The method of claim 9, wherein the plurality of network elements are in a single, monolithic domain.

11. The method of claim 10, wherein boundary links form emulated domains within the single, monolithic domain.

12. The method of claim 9, wherein the control plane comprises one of Automatically Switched Optical Network (ASON), Generalized Multi-Protocol Label Switching (GMPLS), and Optical Signaling and Routing Protocol.

13. The method of claim 9, further comprising:
based on a failure on one of the one or more links, performing segment restoration; and if the segment restoration is not possible, performing end-to-end restoration.

14. A control processor, comprising:
circuitry disposed in a network element; and
a communications interface to a plurality of interconnected network elements to the network element;
wherein the circuitry is configured to
designate one or more links between the network element and the plurality of interconnected network elements as boundary links with respect to a control plane, wherein each of the one or more of links comprises an Internal-Network to Network Interface, wherein each of the designated one or more comprises an Internal-Network to Network Interface emulating an External network-network interface, and wherein the emulating comprises providing Internal-Network to Network Interface features over a link while treating the link as an External network-network interface for call segmentation;
perform a call using the control plane; and
at each of the designated one or more links, perform call segmentation for the call.

15. The control processor of claim 14, wherein the control plane comprises one of Automatically Switched Optical Network (ASON), Generalized Multi-Protocol Label Switching (GMPLS), and Optical Signaling and Routing Protocol.

16. The control processor of claim 14, wherein the network element and the plurality of interconnected network elements each comprise an optical switch operating Internal-Network to Network Interface features therebetween.

17. The network of claim 1, wherein each of the plurality of network elements comprises an optical switch operating Internal-Network to Network Interface features therebetween.

18. The method of claim 9, wherein each of the plurality of network elements comprises an optical switch operating Internal-Network to Network Interface features therebetween.

* * * * *